Patented June 25, 1946

2,402,541

UNITED STATES PATENT OFFICE 2,402,541

CHEMICAL PROCESS

Mark W. Farlow and Wilbur A. Lazier, Wilmington, Del., assignors to E. I. du Pont de Nemours & Company, Wilmington, Del., a corporation of Delaware No Drawing. Application January 22, 1941, Serial No. 375,458

41 Claims. (Cl. 260—404)

1

This invention relates to the manufacture of amides of undecylenic acid and is directed to new and useful processes in which an amine is reacted with an amide-forming ricinoleic compound to form an amide, and the amide is pyrolyzed to yield the corresponding amide of undecylenic acid and other products. Still more particularly, this invention relates to the manufacture of N-isobutylundecylenamide by the pyrolysis of N-isobutylricinoleamide.

The manufacture of N-isobutylundecylenamide has heretofore been dependent upon the separate manufacture of undecylenic acid. The most common, if not the only practical method of producing undecylenic acid is from castor oil or other esters of ricinoleic acid. Formerly it was thus produced as a by-product in the manufacture of heptaldehyde. The undecylenic acid thus obtained is of poor quality and the yields are low. Careful purification is required, especially if an acid suitable for manufacturing N-isobutylundecylenamide is to be obtained. This, coupled with the careful purification which needs to be effected in isolating N-isobutylundecylenamide from the products of the amidation reaction, makes for an undesirably complicated and expensive manufacturing process.

It has now been found that N-isobutylundecylenamide and other amides of undecylenic acid are obtainable in high yields and at low cost by amidating castor oil or like amide-forming ricinoleic compounds with isobutylamine or other amines (inclusive of ammonia), and pyrolyzing the resulting amides. It has been found that when N-isobutylricinoleamide, whether separated, partially separated, or unseparated from the other products of amidation of castor oil with isobutylamine, is subjected to pyrolysis, N-isobutylundecylenamide is formed as the dominant product and can be separated by fractionation in high yields and of a purity suitable for use in fly sprays, as set forth in U. S. Patents 2,166,119 and 2,166,120.

The amidation may be carried out in any of a number of ways, the preferred method being to react castor oil with isobutylamine under suitable amidating conditions. The reaction takes place slowly at room temperature, and if time is not a factor it is sufficient merely to mix the two reagents and to allow the mixture to stand in any suitable container several weeks prior to use. A preferred method, however, is to carry out the reaction at a higher temperature in a pressure vessel as illustrated in the following example, in which the parts are by weight unless otherwise specified.

Example 1

Thirty-one parts of castor oil and 9 parts of isobutylamine are charged into a pressure vessel of such dimensions that on heating to 165° C. a pressure of 100 to 150 lbs. per square inch is obtained. After heating at 165° C. for 16 hours, there is obtained an almost white "Vaseline"-like solid melting at about 30° C. This product is washed with several portions of hot water, then dissolved in ether and washed with dilute hydrochloric acid until free from amine. The ether solution is then dried over anhydrous sodium sulfate and evaporated in vacuo, leaving 30 parts of a product analyzing 3.7% nitrogen.

Another preferred method is to mix castor oil and isobutylamine in appropriate quantities with a small quantity of a low-boiling inert liquid and to heat the mixture under reflux until no further temperature rise occurs in the liquid phase. In this manner, the reaction temperature may be regulated according to the nature and the amount of the inert liquid employed, and the progress of the reaction may be observed by the change in the temperature of the liquid phase under reflux. Two modifications of this method are illustrated by Examples 2 and 3.

Example 2

Fourteen parts of castor oil and 5 parts of isobutylamine are placed in a reaction vessel and heated under reflux at atmospheric pressure with stirring for 12 hours. The excess isobutylamine and the glycerol formed in the reaction are removed by distillation at 2 mm. pressure. The distillation is continued until the temperature of the vapor reaches 160° C. and there is obtained as residue 16 parts of a product having an iodine number of 73.4 (calculated for N-isobutylricinoleamide, 71.9) and a nitrogen content of 3.9% (calculated, 4%).

In this modification, the excess of isobutylamine functions not only to aid in the completion of the reaction but also as the low-boiling inert liquid which governs the final temperature of reflux.

Example 3

A mixture of 2796 parts of castor oil, 657 parts of isobutylamine and 100 parts of toluene is placed in a reaction vessel and heated at atmospheric pressure under reflux until the rate of temperature rise in the liquid phase is small, or until titration of unreacted isobutylamine indicates that the desired degree of amidation has been attained. In a typical operation, the temperature of the liquid rose gradually as follows: 1 hour, 96° C.; 5.5 hours, 150° C; 9.2 hours, 163° C.; 12.3 hours, 170° C.; 16.3 hours, 174° C.; 17.8 hours, 175° C. After a heating period of 18 hours, titration of a portion of the mixture with standard hydrochloric acid, using methyl red as the indicator, showed the presence of only 5% of the isobutylamine originally present, or an amidation of 95%.

In place of the toluene other low-boiling solvents may be employed. As already mentioned, an excess of isobutylamine serves this function in the modification of Example 2. Preferably, however, the solvent is not water-miscible to any great extent so that glycerol and any unreacted amine may be washed out with water without removing the solvent.

The purpose of the low-boiling solvent is primarily to control the final temperature of reflux. Additionally, it aids in washing out glycerol and any unreacted amine. It also has beneficial functions in the pyrolysis, as will be pointed out hereinafter. The nature and character of the solvent is determined largely by its primary function. Thus it should be inert, it should have a low enough boiling point, and should be used in sufficient quantity to keep the final temperature of reflux within the desired limits. It should not be so low-boiling or used in such large quantities, however, that the temperature of reflux becomes too low. Preferably, it should have a boiling point at atmospheric pressure between about 50° C. and 250° C. and should be used in sufficient quantities to provide an initial temperature of reflux above about 50° C. and a final temperature of reflux below about 300° C.

The N-isobutylamide of ricinoleic acid prepared by any suitable amidation process (such as any one of those outlined above) is subjected to pyrolysis to yield the N-isobutylamide of undecylenic acid, probably according to the following equations:

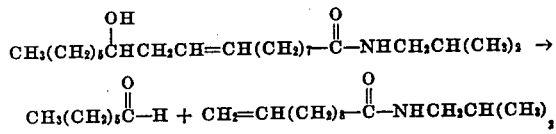

The products of pyrolysis are essentially the N-isobutylamide of undecylenic acid and heptaldehyde, but there may be other materials present, such as the N-isobutylamides of the other acids present in the castor oil, glycerol, unreacted isobutylamine, any inert solvent which may have been used in the amidation, and any unreacted components of the castor oil. While such crude products may be pyrolyzed directly to produce the N-isobutylamide of undecylenic acid, it is of advantage first to recover the glycerol, not only to avoid loss of this valuable product but also to avoid contamination of the N-isobutylamide of undecylenic acid with its products of pyrolysis. Glycerol undergoes dehydration to form the very reactive aldehyde, acrolein. When this product is present during the pyrolysis, undesirable side reactions reduce yields of the desired amide and cause the formation of tar-like substances which are difficult to separate by distillation. Other constituents of the crude amidation product may be removed, if desired, even to the extent of isolating the N-isobutylamide of ricinoleic acid in a relatively pure form, or alternatively a more pure product may be obtained by starting with purer raw materials.

The pyrolysis of the N-isobutylamide of recinoleic acid may be carried out under atmospheric, sub-atmospheric or superatmospheric pressure, and according to the temperature and pressure chosen may be carried out either in the vapor or liquid phase. It is usually accomplished by passing the vapor or liquid, or mixture of vapor and liquid, with or without a diluent, through a cracking tube maintained at cracking temperatures. In a preferred method, the product to be cracked is extended by means of a diluent which may be a liquid, a vapor, or a gas according to whether the cracking is carried out in the vapor or liquid phase. Such diluents aid in the mechanical operations involved in handling the amidation product, and in case of vapor phase processes aid in adjusting the partial pressure of the amide vapors. A volatile thermally stable solvent for the amides such as toluene is a suitable diluent. In the liquid phase process the volatility of the solvent aids in its recovery and separation from the products of pyrolysis, and in the vapor phase process the volatile solvent facilitates the vaporization of the high-boiling amides involved.

Various modifications of the invention are illustrated in the following examples, in which the parts are by weight unless otherwise specified. The percentage yields are based upon 80 parts of ricinoleic acid for each 100 parts of castor oil. The percentage of ricinoleic acid combined in castor oil varies from about 75 to about 85 parts per 100 parts of the oil.

*Example 4*

The amidation product of Example 2 was taken up in 3920 parts of toluene and washed with warm water, the water layer being separated and set aside. The toluene solution thus prepared is introduced dropwise at the rate of 175 parts per hour into the top of a cracking tube consisting of a steel pipe having an internal diameter of 1.50 inches and a length of 40 inches, mounted vertically and packed over a length of 26 inches with solid steel spheres having a diameter of 0.3735 inch. The cracking tube is surrounded by an electric furnace and the temperature in the cracking zone is maintained at 490° to 500° C. by means of automatic controllers actuated by a thermocouple embedded in the walls of the tube at a point approximately midway along the heated length.

From the lower end of the cracking tube, the product is conducted through a water-cooled condenser into a suitable receiver and fitted with means for disposing of gaseous products which are formed in small amounts. The condensed product is transferred to a fractionating still having an efficiency of twenty theoretical plates, and separated into the following fractions, in which the parts are by weight per 100 parts of original solution:

| Substance | B. P. °C./mm. pressure | Parts |
| --- | --- | --- |
| Toluene | To 111/760 | 55.0 |
| Heptaldehyde | 54–58/25 | 2.4 |
| Middle cut | 58/25–152/1 | 7.4 |
| N-isobutylundecylenamide | 152–159/1 | 21.0 |
| Residue | Above 159/1 | 8.1 |

The N-isobutylundecylenamide solidified on cooling and has the following characteristics: Melting point, 25 to 27° C.; nitrogen, found, 5.73% (calculated, 5.85%); iodine number, found, 101 (calculated, 106). These figures correspond to yields of N-isobutylundecylenamide and heptaldehyde of 86 and 21 percent, respectively, of the theoretical.

*Example 5*

The crude product prepared by refluxing 2796 parts of castor oil with 723 parts of isobutylamine for twenty hours, followed by dilution with 1400 parts of methanol, is fed at the rate of 92 parts per hour into an apparatus arranged similarly to that of Example 4 except that the cracking tube is of Pyrex glass packed with 8-mm. lengths of 8-mm. Pyrex glass tubing. The cracking zone is maintained at 500° C.

The product is worked up as described in Example 4 and gives N-isobutylundecylenamide and heptaldehyde in yields of 74 and 35%, respectively, of the theoretical.

*Example 6*

A toluene solution of the amidation products of castor oil and isobutylamine prepared as described in Example 4 is pumped at the rate of 1140 parts per hour through a cracking unit maintained at 475° C. under a pressure of 1000 to 1200 lbs. per sq. inch, the pressure being initially established in the apparatus by means of nitrogen. The cracking unit consists of a helically wound tube embedded in a cylindrical solid aluminum casting. The helix is prepared from a 6-foot length of ¼ inch O. D. by ⅛ inch I. D. chrome-nickel (18–8) stainless steel tubing embedded in an aluminum casting having a diameter of about 2.9 inches and a length of about 18 inches, with 6-inch portions of the tube projecting from each end of the casting. The whole is placed in an electric furnace and provided with suitable temperature controlling instruments, including a thermocouple located in the center of a horizontal section six inches from the top of the casting. In operation the unit is mounted vertically and includes a pump to feed the liquid to be cracked into the lower end of the cracking tube and a receiver connected through a water-cooled condenser with the top of the cracking tube. The receiver is provided with a pressure gauge and a valve so that the unit can be operated at the desired pressure. During the run described, the tendency toward a rise in pressure is counteracted by releasing nitrogen, or, when this is exhausted, the liquid or gaseous product from the receiver as required.

N-isobutylundecylenamide is isolated from the product in a yield of 74% of the theoretical.

*Example 7*

The method of Example 6 is repeated at 450° C. and a pressure of 2000 to 2200 lbs. per sq. inch. The yield of N-isobutylundecylenamide is 66% of the theoretical.

*Example 8*

Using an apparatus similar to that described in Example 6, but with the helix constructed from a 16.5 foot length of ¼ inch I. D. by ⅜ inch O. D. stainless steel tubing, a 43 weight per cent toluene solution of castor oil isobutylamides, freed from glycerol and excess isobutylamine, as described in Example 4, is cracked at the rate of 90 parts per hour at 500° C. and at atmospheric pressure.

N-isobutylundecylenamide and heptaldehyde are isolated from the product in yields of 78 and 48%, respectively, of the theoretical.

*Example 9*

Isobutylamides, prepared and freed of glycerol and excess isobutylamine as described in Example 2, are vaporized and passed downward through a vertically mounted stainless steel tube having an internal diameter of 1.6 inches and a length of 30 inches at the rate of 3,000 cc. per hour at 500° C. and at atmospheric pressure. The cracked material is led through a water-cooled condenser into a receiver. The crude condensate is worked up as in Example 4, giving N-isobutylundecylenamide in a yield of 70% of the theoretical, together with a small amount of heptaldehyde.

*Example 10*

A mixture of 190 parts of castor oil and 44.6 parts of isobutylamine is heated in a closed pressure vessel at 175° C. until titration of a test portion with standard hydrochloric acid and methyl red indicator shows the presence of no more than 4 to 5% of free amine. The crude product is discharged into a settling tank, 104 parts of toluene and 320 parts of water are added, the mixture is warmed to about 80° C., agitated, and finally allowed to settle into two layers. The lower layer is drawn off and discarded while the oil layer is vaporized at a rate of 3500 cc. per hour and passed downward through a vertically mounted, stainless steel pipe having an internal diameter of 1.6 inches and a length of 30 inches, maintained at 500° C. and at atmospheric pressure. The product is condensed and fractionally distilled as in Example 4, giving N-isobutylundecylenamide in a yield of 80% of the theoretical, together with a 60% yield of heptaldehyde.

The foregoing examples are intended by way of illustration only because numerous variations may be made in the various aspects of the invention without departing from the novel principles outlined. Thus, a wide variety of amides of undecylenic acid may be prepared according to the principles outlined.

Thus, according to the broader principles of the invention, castor oil or any amide-forming ricinoleic compound, such as ricinoleic acid, its esters, such as the methyl, ethyl, butyl, phenyl, and heptyl and like esters, its anhydride, and halide may be reacted with ammonia or any suitable aliphatic or aromatic amine, e. g., ethyl, propyl, amyl, octyl, dodecyl, hexadecyl, and cyclohexyl amines, piperidine, alpha-aminopyridine, aniline, etc., and the resulting amide of ricinoleic acid subjected to pyrolysis to yield the corresponding amide of undecyclenic acid.

Variations likewise may be made in the details of the cracking processes and, as indicated in the examples, a wide range of conditions of temperature, pressure and space velocity in the cracking zone may obtain. Although the proper interrelation of these variables is important in the practical and economical operation of the invention, they are not so critical as to make their precise determination necessary to the successful practice of the invention. By an examination of the examples herein set forth, one can select a set of conditions applicable to the apparatus at hand. For example, if production of gaseous or low-boiling liquid products is excessive, the cracking conditions are too severe and the use of lower temperatures or shorter times of contact or a combination of both is indicated.

In general, it will be found that best results are obtained within a temperature range of about 400° to 550° C. and at pressures up to about 3000 lbs. per sq. inch. Within these ranges of temperatures and pressures, the pyrolysis may be effected simply by adjusting the space velocity to the optimum yield of undecylenamide. If desired, however, the process may be operated at subatmospheric pressures.

Though with a given apparatus greater capacity is obtained at higher pressures, it is generally more desirable to operate at lower pressures not only for mechanical reasons but because higher yields of undecylenamide are obtainable. It is preferable to operate under conditions of temperature and pressure such that the cracking takes place in the vapor phase. Although the line of demarcation between vapor phase and liquid phase processes is not always apparent, in general, the advantages of vapor phase operation are more likely to be obtained at pressures less than about 100 lbs. per sq. inch.

Other variations in the details of the cracking processes, particularly with reference to the nature of the diluent, may be made. Thus, in place of the toluene and methanol illustrated there may be substituted other thermally stable volatile solvents for the amides. Volatile aromatic hydrocarbons or their alkyl substitution products are preferred, such as benzene, toluene, the xylenes, amyl benzenes, and the like. Other solvents, however, such as methanol, cyclohexane, diethyl ether, kerosene or gasoline and the like may be used. Any solvent which is thermally stable and inert to the essential reactants and products may be used. The diluent function of the solvent may also be obtained wholly or in part by means of an inert carrier gas such as nitrogen, carbon dioxide, dimethyl ether, and the like.

The quantity of diluent may be varied widely without deleteriously affecting the operations. Preferably, however, it is used in such quantities that the fluid undergoing cracking does not contain more than about 90% of the amidation product. In other words, about 10 to 50% of the fluid should be made up of the diluent. In case the diluent is a solvent for the amide, it should be used in sufficient amount to provide a free-flowing and easily handled solution, especially if a vapor phase cracking process is involved. In such a case, solutions containing from 50 to 90% of the amidation product are most suitable.

While the amidation and pyrolysis processes have been illustrated as separate steps, it is possible to carry out the two reactions simultaneously. Thus, a solution of castor oil or other amide-forming ricinoleic compound and isobutylamine, or other amine, in toluene or other solvent may be fed directly into the cracking zone and N-isobutylundecyleneamide isolated from the reaction product. In such cases, however, because the rates of amidation and pyrolysis are not the same it is sometimes desirable to provide suitable differentials in temperature and space velocity. Thus, with apparatus similar to that described in Example 6 two temperature zones may be maintained, one optimum for amidation and the other optimum for cracking. These modifications are most suitably carried out at high pressures as in Examples 6 and 7, since the amidation proceeds more rapidly under the influence of temperature and pressure. In such modifications it may be desirable to use simple esters of ricinoleic acid such as the methyl ester or the acid itself, or its anhydride, instead of castor oil and thus avoid having the reaction product contaminated with glycerol decomposition products.

Since many apparently widely differing embodiments of the invention may be made, it is to be understood that such variations as come within the spirit of the invention are intended to be included.

We claim:

1. In the manufacture of the N-isobutylamide of undecylenic acid, the method which comprises reacting castor oil with isobutylamine to form the N-isobutylamide of ricinoleic acid, diluting the amide thus formed with an inert substantially water-insoluble solvent therefor, washing with water to remove glycerol and unreacted isobutylamine, vaporizing said amide in admixture with the vapors of said solvent to pyrolysis to form heptaldehyde and the N-isobutylamide of undecylenic acid and isolating the amide thus formed.

2. In the manufacture of the N-isobutylamide of undecylenic acid, the method which comprises reacting castor oil with isobutylamine at atmospheric pressure and under reflux in the presence of an inert, substantially water-insoluble, liquid soluble in the reaction mixture, said liquid boiling substantially at a temperature of 50° C. to 250° C. and being present in an amount sufficient to provide a final temperature of reflux in the liquid phase not substantially in excess of 300° C., diluting the reaction mixture with an additional quantity of said liquid, washing with water to remove glycerol and unreacted isobutylamine, subjecting the washed product to pyrolysis to form heptaldehyde and the N-isobutylamide of undecylenic acid and isolating the amide thus formed.

3. In the manufacture of amides of ricinoleic acid, the method which comprises reacting castor oil with isobutylamine under reflux and at atmospheric pressure in the presence of an inert, substantially water-insoluble, liquid soluble in the reaction mixture, said liquid boiling substantially at a temperature of 50° C. to 250° C. and being present in an amount sufficient to provide a final temperature of reflux in the liquid phase not substantially in excess of 300° C., diluting the product with a further quantity of said liquid sufficient to provide a fluid product when cooled, and washing it with water to remove glycerol and any unreacted isobutylamine.

4. The method which comprises reacting castor oil with isobutylamine under reflux and at atmospheric pressure in the presence of an inert substantially water-insoluble liquid soluble in the reaction mixture, said liquid boiling substantially at a temperature of 50° C. to 250° C. and being present in an amount such that the final temperature of reflux in the liquid phase does not substantially exceed 300° C.

5. The method which comprises reacting castor oil with isobutylamine under reflux and at atmospheric pressure in the presence of an inert substantially water-insoluble liquid soluble in the reaction mixture, said liquid boiling substantially at a temperature of 50° C. to 250° C. and being present in an amount such that the final temperature of reflux in the liquid phase does not substantially exceed 300° C., adding a further quantity of said liquid sufficient to produce a fluid product when cooled, and washing it with water to remove glycerol and any unreacted isobutylamine.

6. In the manufacture of amides of undecylenic acid the method which comprises amidating castor oil to form an amide of ricinoleic acid, removing glycerol, dissolving the amide of ricinoleic acid in an inert solvent, subjecting said solution to pyrolysis to form heptaldehyde and the amide of undecylenic acid and isolating the amide thus formed.

7. In the manufacture of amides of undecylenic acid, the method which comprises preparing a solution of an amide of ricinoleic acid in an inert solvent therefor having a boiling point between 50° C. and 250° C., vaporizing the solution and heating the vapors of the amide of ricinoleic acid while in admixture with the vapors of said solvent to a temperature of 400° to 550° C. to form the corresponding amide of undecylenic acid and heptaldehyde.

8. In the manufacture of amides of undecylenic acid, the method which comprises subjecting an amide of ricinoleic acid to pyrolysis substantially at a temperature of 400° C. to 550° C. and while the partial pressure of the amide is substantially less than atmospheric pressure.

9. In the manufacture of amides of undecylenic acid, the method which comprises subjecting an amide of ricinoleic acid to pyrolysis substantially at a temperature of 400° C. to 550° C. while the amide is in the vapor state and in admixture with a gaseous diluent.

10. In the manufacture of amides of undecylenic acid, the method which comprises vaporizing an amide of ricinoleic acid and subjecting the vapor in admixture with a gaseous diluent to pyrolysis substantially at a temperature of 400° C. to 550° C.

11. In the manufacture of amides of undecylenic acid, the method which comprises vaporizing a solution of an amide of ricinoleic acid in a thermally stable liquid hydrocarbon and heating the vapors substantially at a temperature of 400° C. to 550° C.

12. In the manufacture of amides of undecylenic acid, the method which comprises subjecting an amide of ricinoleic acid to pyrolysis substantially at a temperature of 400° C. to 550° C. and substantially at a pressure between 100 and 3000 lbs. per sq. inch.

13. In the manufacture of amides of undecylenic acid, the method which comprises subjecting a solution of an amide of ricinoleic acid in an inert solvent to pyrolysis substantially at a temperature of 400° C. to 550° C. and at a pressure sufficient to prevent substantial vaporization of the amide.

14. In the manufacture of amides of undecylenic acid, the method which comprises subjecting an amide of ricinoleic acid to pyrolysis substantially at a temperature of 400° C. to 550° C. to form the corresponding amide of undecylenic acid and heptaldehyde and isolating the amide thus formed.

15. In the manufacture of amides of undecylenic acid, the method which comprises subjecting an amide of ricinoleic acid to pyrolysis substantially at a temperature of 400° C. to 550° C. and at a pressure such that the boiling point of the amide of ricinoleic acid is below its decomposition temperature.

16. In the manufacture of the N-isobutylamide of undecylenic acid, the method which comprises reacting castor oil with isobutylamine to form the N-isobutylamide of ricinoleic acid, diluting the amide thus formed with an inert substantially water-insoluble solvent therefor boiling substantially at a temperature of 50° C. to 250° C., washing with water to remove glycerol and unreacted isobutylamine, vaporizing said amide and subjecting it in admixture with the vapors of said solvent to pyrolysis to form heptaldehyde and the N-isobutylamide of undecylenic acid and isolating the amide thus formed.

17. In the manufacture of the N-isobutylamide of undecylenic acid, the method which comprises reacting castor oil with isobutylamine to form the N-isobutylamide of ricinoleic acid, diluting the amide thus formed with an inert substantially water-insoluble solvent therefor boiling substantially at a temperature of 50° C. to 250° C. in an amount sufficient to provide a final temperature of reflux in the liquid phase not substantially in excess of 300° C., washing with water to remove glycerol and unreacted isobutylamine, vaporizing said amide and subjecting it in admixture with the vapors of said solvent to pyrolysis to form heptaldehyde and the N-isobutylamide of undecylenic acid and isolating the amide thus formed.

18. In the manufacture of the N-isobutylamide of undecylenic acid, the method which comprises reacting castor oil with isobutylamine at atmospheric pressure and under reflux in the presence of a volatile aromatic hydrocarbon solvent, boiling substantially at a temperature of 50° C. to 250° C., in an amount sufficient to provide a final temperature of reflux in the liquid phase not substantially in excess of 300° C., diluting the reaction mixture with an additional quantity of said solvent, washing with water to remove glycerol and unreacted isobutylamine, subjecting the washed product to pyrolysis to form heptaldehyde and the N-isobutylamide of undecylenic acid and isolating the amide thus formed.

19. In the manufacture of amides of ricinoleic acid, the method which comprises reacting castor oil with isobutylamine under reflux and at atmospheric pressure in the presence of a volatile aromatic hydrocarbon solvent, boiling substantially at a temperature of 50° C. to 250° C., in an amount sufficient to provide a final temperature of reflux in the liquid phase not substantially in excess of 300° C., diluting the product with a further quantity of said solvent sufficient to provide a fluid product when cooled, and washing it with water to remove glycerol and any unreacted isobutylamine.

20. The method which comprises reacting castor oil with isobutylamine under reflux and at atmospheric pressure in the presence of a volatile aromatic hydrocarbon solvent, boiling substantially at a temperature of 50° C. to 250° C., in an amount such that the final temperature of reflux in the liquid phase does not substantially exceed 300° C.

21. The method which comprises reacting castor oil with isobutylamine under reflux and at atmospheric pressure in the presence of a volatile aromatic hydrocarbon solvent, boiling substantially at a temperature of 50° C. to 250° C., in an amount such that the final temperature of reflux in the liquid phase does not substantially exceed 300° C., adding a further quantity of said solvent sufficient to produce a fluid product when cooled, and washing it with water to remove glycerol and any unreacted isobutylamine.

22. In the manufacture of the isobutylamide of undecylenic acid, the method which comprises amidating castor oil to form the isobutylamide of ricinoleic acid, removing glycerol, dissolving the isobutylamide of ricinoleic acid in an inert solvent, subjecting said solution to pyrolysis to form heptaldehyde and the isobutylamide of undecylenic acid and isolating the amide thus formed.

23. In the manufacture of the isobutylamide of undecylenic acid, the method which comprises preparing a solution of an amide of ricinoleic acid in an inert solvent therefor having a boiling point between 50° C. and 250° C., vaporizing the solution and heating the vapors of the isobutylamide of ricinoleic acid while in admixture with the vapors of said solvent to a temperature of 400° C. to 550° C. to form the isobutylamide of undecylenic acid and heptaldehyde.

24. In the manufacture of the isobutylamide of undecylenic acid, the method which comprises subjecting the isobutylamide of ricinoleic acid to pyrolysis substantially at a temperature of 400° C. to 550° C. and while the partial pressure of the isobutylamide of ricinoleic acid is substantially less than atmospheric pressure.

25. In the manufacture of the isobutylamide of undecylenic acid, the method which comprises subjecting the isobutylamide of ricinoleic acid to pyrolysis substantially at a temperature of 400° C. to 550° C. while the isobutylamide of ricinoleic acid is in the vapor state and in admixture with a gaseous diluent.

26. In the manufacture of the isobutylamide of undecylenic acid, the method which comprises vaporizing the isobutylamide of ricinoleic acid and subjecting the vapor in admixture with a gaseous diluent to pyrolysis substantially at a temperature of 400° C. to 550° C.

27. In the manufacture of the isobutylamide of undecylenic acid, the method which comprises vaporizing a solution of the isobutylamide of ricinoleic acid in a thermally stable liquid hydrocarbon and heating the vapors substantially at a temperature of 400° C. to 550° C.

28. In the manufacture of the isobutylamide of undecylenic acid, the method which comprises subjecting the isobutylamide of ricinoleic acid to pyrolysis substantially at a temperature of 400° C. to 550° C. and substantially at a pressure between 100 and 3000 lbs. per square inch.

29. In the manufacture of the isobutylamide of undecylenic acid, the method which comprises subjecting a solution of the isobutylamide of ricinoleic acid in an inert solvent to pyrolysis substantially at a temperature of 400° C. to 550° C. and at a pressure sufficient to prevent substantial vaporization of the isobutylamide of ricinoleic acid.

30. In the manufacture of the isobutylamide of undecylenic acid, the method which comprises subjecting the isobutylamide of ricinoleic acid to pyrolysis substantially at a temperature of 400° C. to 550° C. to form the isobutylamide of undecylenic acid and heptaldehyde and isolating the isobutylamide thus formed.

31. In the manufacture of the isobutylamide of undecylenic acid, the method which comprises subjecting the isobutylamide of ricinoleic acid to pyrolysis substantially at a temperature of 400° C. to 550° C. and at a pressure such that the boiling point of the isobutylamide of ricinoleic acid is below its decomposition temperature.

32. In the manufacture of the N-isobutylamide of undecylenic acid, the method which comprises reacting castor oil with isobutylamine to form the N-isobutylamide of ricinoleic acid, diluting the amide thus formed with toluene, washing with water to remove glycerol and unreacted isobutylamine, vaporizing said amide and subjecting it in admixture with the vapors of toluene to pyrolysis to form heptaldehyde and the N-isobutylamide of undecylenic acid and isolating the amide thus formed.

33. In the manufacture of the N-isobutylamide of undecylenic acid, the method which comprises reacting castor oil with isobutylamine at atmospheric pressure and under reflux in the presence of toluene in an amount sufficient to provide a final temperature of reflux in the liquid phase not substantially in excess of 300° C., diluting the reaction mixture with an additional quantity of toluene, washing with water to remove glycerol and unreacted isobutylamine, subjecting the washed product to pyrolysis to form heptaldehyde and the N-isobutylamide of undecylenic acid and isolating the amide thus formed.

34. In the manufacture of amides of ricinoleic acid, the method which comprises reacting castor oil with isobutylamine under reflux and at atmospheric pressure in the presence of toluene in an amount sufficient to provide a final temperature of reflux in the liquid phase not substantially in excess of 300° C., diluting the product with a further quantity of toluene sufficient to provide a fluid product when cooled, and washing it with water to remove glycerol and any unreacted isobutylamine.

35. The method which comprises reacting castor oil with isobutylamine under reflux and at atmospheric pressure in the presence of toluene in an amount such that the final temperature of reflux in the liquid phase does not substantially exceed 300° C.

36. The method which comprises reacting castor oil with isobutylamine under reflux and at atmospheric pressure in the presence of toluene in an amount such that the final temperature of reflux in the liquid phase does not substantially exceed 300° C., adding a further quantity of toluene sufficient to produce a fluid product when cooled, and washing it with water to remove glycerol and any unreacted isobutylamine.

37. In the manufacture of the isobutylamide of undecylenic acid, the method which comprises amidating castor oil to form the isobutylamide of ricinoleic acid, removing glycerol, dissolving the isobutylamide of ricinoleic acid in toulene, subjecting said solution to pyrolysis to form heptaldehyde and the isobutylamide of undecylenic acid and isolating the amide thus formed.

38. In the manufacture of the isobutylamide of undecylenic acid, the method which comprises preparing a solution of an amide of ricinoleic acid in toluene, vaporizing the solution and heating the vapors of the isobutylamide of ricinoleic acid while in admixture with the vapors of toluene to a temperature of 400° C. to 550° C. to form the isobutylamide of undecylenic acid and heptaldehyde.

39. In the manufacture of the isobutylamide of undecylenic acid, the method which comprises subjecting the isobutylamide of ricinoleic acid to pyrolysis substantially at a temperature of 400° C. to 550° C. while the isobutylamide of ricinoleic acid is in the vapor state and in admixture with vapor of toluene.

40. In the manufacture of the isobutylamide of undecylenic acid, the method which comprises vaporizing the isobutylamide of ricinoleic acid and subjecting the vapor in admixture with vapor of toluene to pyrolysis substantially at a temperature of 400° C. to 550° C.

41. In the manufacture of the isobutylamide of undecylenic acid, the method which comprises subjecting a solution of the isobutylamide of ricinoleic acid in toluene to pyrolysis substantially at a temperature of 400° C. to 550° C. and at a pressure sufficient to prevent substantial vaporization of the isobutylamide of ricinoleic acid.

MARK W. FARLOW.
WILBUR A. LAZIER.